United States Patent [19]

Kishi et al.

[11] 4,086,633

[45] Apr. 25, 1978

[54] NUMERICAL CONTROL SYSTEM WITH PROGRAM ACCESS FUNCTION

[75] Inventors: Hajimu Kishi; Tetsuo Ohkubo; Noriyuki Koikawa, all of Tokyo, Japan

[73] Assignee: Oki Electric Industry Co., Ltd., Tokyo, Japan

[21] Appl. No.: 694,933

[22] Filed: Jun. 11, 1976

[30] Foreign Application Priority Data

Jun. 24, 1975 Japan .................................. 50-76436

[51] Int. Cl.² ........................................... G05B 19/28
[52] U.S. Cl. .................................... 364/474; 364/300
[58] Field of Search .................................... 235/151.11

[56] References Cited

U.S. PATENT DOCUMENTS

| 3,519,905 | 7/1970 | Little et al. ................. 235/151.11 X |
| 3,559,179 | 1/1971 | Rhoades ....................... 235/151.11 X |
| 3,562,715 | 2/1971 | Bishop et al. ................ 235/151.11 X |

Primary Examiner—Eugene G. Botz
Attorney, Agent, or Firm—Kenyon & Kenyon

[57] ABSTRACT

A numerical control system having a memory and a register is disclosed. A command which is frequently used is stored in the memory. The stored command is read out of the memory by a particular command, and then used to control a machine tool. Thus, the program of a numerical control system can be simplified since it is not necessary to repeatedly program said command which is frequently used.

3 Claims, 7 Drawing Figures

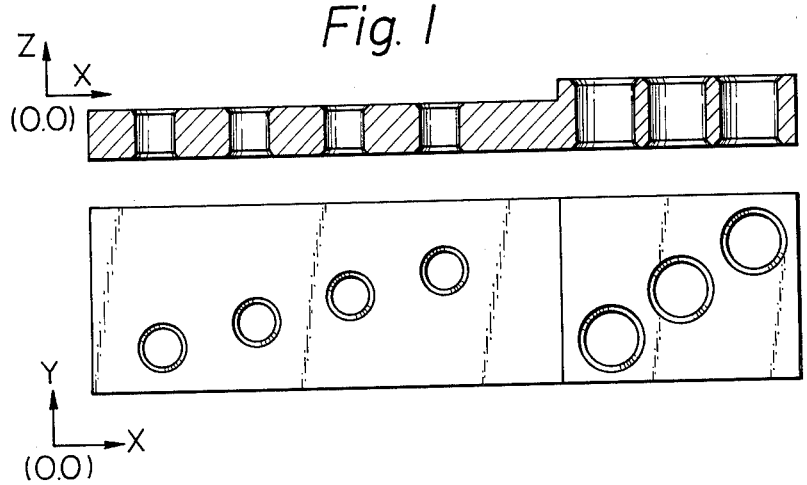
Fig. 1
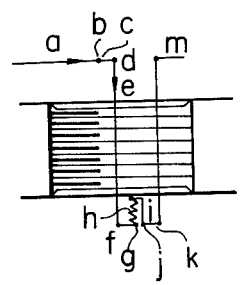
Fig. 2
Fig. 3
a. G91G00X30000Y10000
b. M05
c. M19
d. X5000
e. Z-25000
f. X-5000
g. M03
h. G01Z5000F200
i. G00Z-5000
b. M05
j. M19
k. X5000
l. Z25000
m. X-5000
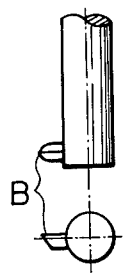
Fig. 4

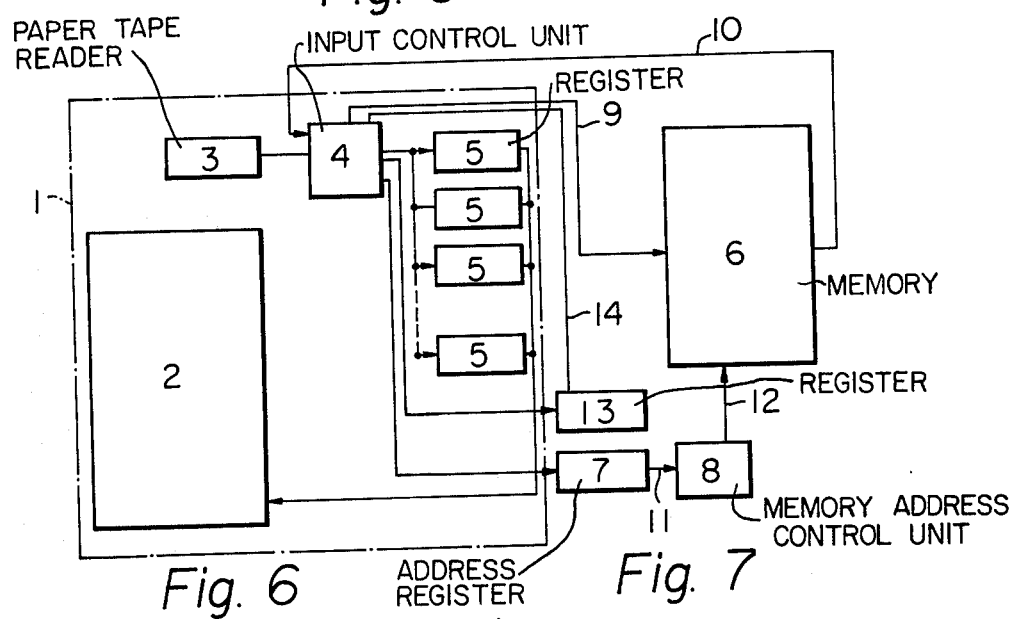
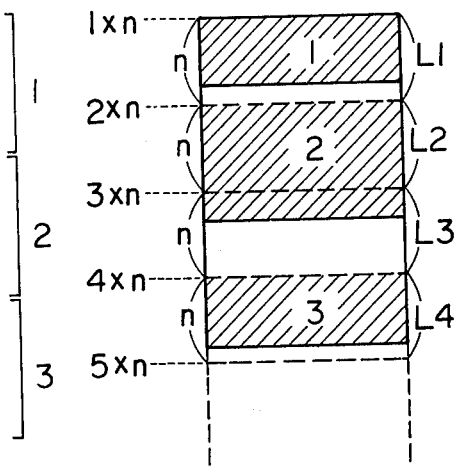

NUMERICAL CONTROL SYSTEM WITH PROGRAM ACCESS FUNCTION

BACKGROUND OF THE INVENTION

The present invention relates to a numerical control system (referred to as NC hereinbelow) used in combination with a numerically-controlled machine tool (referred to as NC machine hereinbelow) so as to function very effectively when a work piece to be worked has many different kinds of repeatable work processes.

Many of the pieces worked by the NC machine involved several kinds of repeatable worked shapes. In order to work many pieces in the same shape patterns, a command tape must be prepared for each of the patterns. This leads to the following disadvantages.

(1) It takes a long time to prepare a command tape.
(2) The number of errors in the command tape prepared tends to be increase.

Heretofore, there have been proposed methods to compensate for such disadvantages. According to the first prior art, an electronic circuit is used to set up several specified kinds of working patterns which are frequently and commonly adopted, thereby permitting simple preparation of command tapes in cases where such specified kinds of working patterns are used to work a piece. This is called "fixed cycle".

With the second prior art an additional tape reader (referred to as sub tape reader hereinbelow) is provided. A command tape for a repeatable pattern is set in said sub tape reader. When the repeatable pattern is requested with the command tape set on the primary tape reader (referred to as main tape reader hereinbelow), a piece is cut in the requested patterns by changing a sub tape reader which operates with the particular command.

However, there occurs very frequently the necessity of working the patterns originally specified by the respective users. The first prior art is not applicable to such unique working patterns which are different from the predetermined specified fixed pattern, required by the users. Further, in case of the second prior art, the following drawbacks can not be avoided.

(1) The sub tape reader needs additional space.
(2) The command tape for a repeatable work process, which is repeatedly used, can be easily damaged or smudged.

SUMMARY OF THE INVENTION

Accordingly, the present invention has the principle object of providing a new and different method from the above described conventional methods in order to eliminate the disadvantages of the conventional NC used in working a piece with several kinds of repeatable processes.

The above object can be attained according to the present invention, by providing a numerical control system with program access function and incorporating a memory to store numerical control command information, characterized in that when a specified memory storage start command code is contained in the numerical control command information, said memory stores sequentially the subsequent numerical control information from an address determined with the address information of said memory, which has been designated along with or before said memory storage start command code, until a memory storage termination command code arrives; while when another memory access command code arrives, the subsequent numerical control command information is read out of an address determined with the address information of said memory, which has been designated along with or before said memory access command code until a memory storage termination command code arrives.

BRIEF DESCRIPTION OF THE DRAWINGS

The foregoing and other objects, features and attendant advantages of the present invention will be appreciated as the same become better understood by means of the following description and the accompanying drawings wherein:

FIG. 1 shows an example workpiece which has been repeatedly worked;

FIG. 2 explains how to work the piece shown in FIG. 1;

FIG. 3 shows an NC program for the work process in FIG. 2;

FIG. 4 shows an example tool;

FIG. 5 is a block diagram of an NC according to the present invention;

FIG. 6 shows an example of command information, and;

FIG. 7 explains the memory allocation.

DESCRIPTION OF THE PREFERRED EMBODIMENT

First, a general explanation concerning the NC will be presented to enable easy understanding of the present invention.

The example workpiece with the shape shown in FIG. 1 is not special but, rather, is common. The example workpiece of FIG. 1 is worked in the following steps.

(1) Drilling.
(2) Chamfering of top and bottom surfaces by using a chamfering boring bite.
(3) Tapping.

The drilling work in Step (1), work of chamfering the top surface in Step (2) and the tapping work in Step (3) can be executed with a common fixed cycle for an NC, but the chamfering work of the bottom surface in Step (2) is not performed by an ordinary fixed process. In the case of an NC machine with a function to orient the spindle, a tool shown in FIG. 4 (the symbol B shows a bit) is used to work a piece as shown in FIG. 2, by preparing in one block on the common tape the work programs as follows.

(a) Positioning the tool in the center of a hole to be formed.
(b) Stopping the spindle.
(c) Directing in one direction the cutting blade of the boring bit (tool) by the orientation command.
(d) Moving slightly the bit in the direction opposite to the cutting blade.
(e) Cutting off the piece to the bottom of the hole.
(f) Re-positioning the tool in the hole center.
(g) Commanding the revolution of the spindle.
(h) Chamfering.
(i) Repositioning the tool to the position in Step (e) (Z-direction).
(j) Commanding the orientation.
(k) Moving the tool in the direction opposite to the cutting blade.
(l) Returning the tool to the top surface.
(m) Again positioning the tool in the hole center.

The block of the command tape will contain the work programs as shown in FIG. 3, for the case of the work in FIG. 1. In FIG. 3, the labels (a, b, c . . . ) correspond to those of the above explanation.

However, when a piece is worked by using an ordinary NC which functions in only a fixed cycle, a program as shown in FIG. 3 must be inserted into the command tape each time the bottom surfaces is to be chamfered. As a result, the programing work takes a long time and the tape itself is long.

Further, when a sub-tape-reader is provided in the NC for a program, for example, in FIG. 3, the groups of small and large holes have to be made as programmed separately for chamfering the bottom surface, and thus the program set in the sub-tape-reader must be changed by an operator.

The present inventin overcomes the above problems of the prior arts by introducing a memory for a repeatable program and a register in an NC apparatus.

FIG. 5 shows a block diagram of the NC according to the present invention in which the block 1, as enclosed by the one dot dashed line, is a conventional NC. The command information from the paper tape reader 3 is decoded in the input control unit 4. The decoded data are set in each of the registers 5 according to the address codes (N, G, X, Y, Z, S, T, M, etc.) on the command tape. According to the data set in the registers 5, the section including the interpolator circuit, servo circuit, digital input/output circuit, and others, which an ordinary NC has, is controlled, and finally the machine tool is controlled. With the present invention, two registers and a memory are additionally connected to such a conventional NC 1. The first register 7 is so arranged that when a specified command code, for example, "L", is read out from the input control circuit 4, the numerical value following the code "L", for example, 2 for the code "L2" is set in the register. The signal of the numerical value m set in the register 7 is supplied through the line 11 to the memory address control unit 8 where the signal is multiplied by $n$ (=integer). The value $n$ is usually 128 or 256 bytes and is stored in the unit 8. The output of the unit 8 is supplied through the memory address control line 12 to the memory 6.

Now suppose that a specified memory storage start command arrives (for example, G25, since such a preparation command is given in G code according to the EIA and ISO Standards). All the subsequent commands are sequentially stored in the memory, by taking as the initial address ($m \times n$) delivered on the line 12, where "m" is the value stored in the register 7 and "n" is an integer stored in the unit 8, until a specified memory storage termination commmand arrives (for example, G26).

Next, when the NC receives a code (for example, G24) which commands the execution of the program stored in the memory, the input/output control unit 4 will no longer read any command from the paper tape reader 3, while it will read and continue to read sequentially the command data stored in the memory 6, by taking the starting address of the memory determined by the address register 7 and delivered on the line 12, until a termination command code is read in the input/output control unit. The command read out of the memory is applied to the input control unit 4 through the line 10. Every time such a termination command code arrives, the input control unit 4 will subtract one from the value which has been supplied to the register 13 through the input/output control unit along with or before the supply of the G24, where it is supposed that the register 13 stores the repetition value. When the result is not zero the above operation is repeated.

When the value of the register 13 is nulled after the above-mentioned procedures are repeated several times, the input control unit will read again the following command out of the paper tape reader 3 for the next operation.

The important advantage of the present invention exists in the fact that the starting address of the command stored in and read out of the memory can be designated very easily.

FIG. 6 shows an example of the command prepared according to the present invention, and FIG. 7 shows how the command shown in FIG. 6 is stored in the memory. The block 1 which starts with the command G25 and finishes with the command G26 is stored in the shadowed area 1 of FIG. 7. The start address of the block 1 is designated by the command L1, and is $1 \times n$. Since a number of characters in the block 1 is less than $n$, the second block 2 can start with the address $2 \times n$ by designating the start address L2. The block 2 has more than $n$ characters and needs two space areas in the memory, therefore the block 3 is stored with the start address $4 \times n$ by designating the start address L4. It should be noted from the above explanation that any number of programs can be stored in a memory by providing a sufficient capacity of memory.

The statement (N020G24L1P5) in FIG. 6 indicate to perform (G24) the command stored in the memory, from the start address $1 \times n$(L1), five times (P5). Further, a new program can be stored over an old and unnecessary program stored in the memory. This permits various unique repeatable programs by using a memory with a relatively small capacity. This advantage can not be obtained in the prior sub tape system.

From the foregoing it will now be apparent that a new and improved numerical control system has been found. It should be understood, of course, that the embodiment disclosed is merely illustrative and is not intended to limit the scope of the invention. Reference should be made to the appended claims, therefore, rather than the specification as indicating the scope of the invention.

What is claimed is:

1. A numerical control system for controlling a machine tool in accordance with command data including at least one repeat-data to be repeatedly executed, comprising
    a machine tool control section;
    input means for receiving said command data;
    a memory for storing said repeat-data;
    means for decoding a first command code (G25), a second command code (G26), and a third command code (G24) respectively from said command data;
    means for decoding a fourth command code (L) from said command data and storing following numerical value thereof which represents an initial address for said repeatdata in said memory;
    means for decoding a fifth command code (P) from said command data and storing following numerical value thereof which represents the number of repetition of said repeat-data and which is counteddown at every decoding moments of said second command code (G26);
    means for executing storing operation in which said repeat-data applied to said input means is stored in said memory corresponding to said address signal when said first command code (G25) is decoded, and maintaining said storing operation until said second command code (G26) is decoded, and;

means for executing reading operation in which said repeat-data stored in said memory is read out corresponding to said address signal and is fed to said machine tool control section when said third command code (G24) is decoded, and repeating said reading operation until said numerical value which represents the number of repetition is nulled.

2. A numerical control unit as defined in claim 1, wherein said input means is a paper tape reader.

3. A numerical control unit as defined in claim 1 further comprising a multiplier wherein said initial address for said repeat data is determined by multiplying said numerical value ($m$) following said fourth command (L) and an integer ($n$) which is stored in said multiplier.

* * * * *